United States Patent
Chang et al.

(10) Patent No.: US 7,438,662 B2
(45) Date of Patent: Oct. 21, 2008

(54) SIX-SPEED POWER TRAIN OF AUTOMATIC TRANSMISSION FOR VEHICLE

(75) Inventors: Hoon Chang, Hwaseong (KR); Wook Jin Jang, Yongin (KR)

(73) Assignee: Hyundai Motor Company, Seoul (KR)

( * ) Notice: Subject to any disclaimer, the term of this patent is extended or adjusted under 35 U.S.C. 154(b) by 244 days.

(21) Appl. No.: 11/595,400

(22) Filed: Nov. 8, 2006

(65) Prior Publication Data

US 2008/0015083 A1   Jan. 17, 2008

(30) Foreign Application Priority Data

Jul. 11, 2006   (KR) ...................... 10-2006-0065034

(51) Int. Cl.
*F16H 3/62* (2006.01)
*F16H 3/44* (2006.01)

(52) U.S. Cl. ...................................... 475/276; 475/280

(58) Field of Classification Search ......... 475/275–292, 475/313, 319, 325
See application file for complete search history.

(56) References Cited

U.S. PATENT DOCUMENTS

| | | | | |
|---|---|---|---|---|
| 5,133,697 A | * | 7/1992 | Hattori | ....................... 475/276 |
| 6,849,022 B2 | * | 2/2005 | Miyazaki et al. | ............. 475/275 |
| 7,300,383 B2 | * | 11/2007 | Nozaki et al. | ................ 477/131 |
| 2004/0026155 A1 | * | 2/2004 | Miyata et al. | ................ 180/337 |
| 2005/0202924 A1 | * | 9/2005 | Friedmann et al. | ........... 475/275 |
| 2005/0255958 A1 | * | 11/2005 | Tiesler et al. | ................ 475/275 |

* cited by examiner

*Primary Examiner*—Roger Pang
(74) *Attorney, Agent, or Firm*—Morgan Lewis & Bockius LLP (57) ABSTRACT

A six-speed power train of an automatic transmission for a vehicle includes: a first, double pinion planetary gear set including a first operational element always operating as an input element, a second operational element selectively operating as an output and a fixed element, and a third operational element selectively operating as an input element, an output element, and a fixed element; a second, Ravingneaux type planetary gear set including a first operational element selectively operating as an input element, a second operational element always operating as an output element, a third operational element selectively operating as an input element and a fixed element, and a fourth operational element selectively operating as a fixed element; a plurality of clutches disposed between and variably connecting operational elements of the first and second planetary gear sets; and a plurality of brakes variably connecting a transmission housing with one of the fixed elements.

8 Claims, 6 Drawing Sheets

|  | B1 | B2 | B3 | C1 | C2 | C3 | speed ratio | step ratio |
|---|---|---|---|---|---|---|---|---|
| first forward speed | O |  |  |  | O |  | 3.333 |  |
| second forward speed | O |  |  |  |  | O | 2.286 | 1.458 |
| third forward speed |  |  | O |  | O |  | 1.667 | 1.371 |
| fourth forward speed |  |  | O |  |  | O | 1.367 | 1.219 |
| fifth forward speed |  |  |  | O |  | O | 1.000 | 1.367 |
| sixth forward speed |  |  | O | O |  |  | 0.714 | 1.400 |
| first reverse speed |  | O |  |  | O |  | -4.091 |  |
| secon reverse speed |  | O | O |  |  |  | -0.918 | 4.455 | ated as an output element and a fixed element, and a third
SIX-SPEED POWER TRAIN OF AUTOMATIC TRANSMISSION FOR VEHICLE

CROSS-REFERENCE TO RELATED APPLICATION

This application claims priority to and the benefit of Korean Patent Application No. 10-2006-0065034 filed in the Korean Intellectual Property Office on Jul. 11, 2006, the entire contents of which are incorporated herein by reference.

BACKGROUND OF THE INVENTION (a) Field of the Invention

The present invention relates to an automatic transmission, and more particularly, to a power train of an automatic transmission.

(b) Description of the Related Art

A multi-stage gearshift mechanism of an automatic transmission includes a plurality of planetary gear sets. A power train having such a plurality of planetary gear sets varies the torque in multiple stages and outputs it to an output shaft when receiving a converted engine torque from a torque converter.

The more speeds the power train of an automatic transmission has, the better the power performance and fuel consumption. Therefore, it is desirable for power trains to have as many speeds as possible.

For the same number of speeds, durability, power transmission efficiency, and size/weight of a transmission are substantially dependent on how the planetary gear sets are arranged.

For a manual transmission, too many speeds cause a driver the inconvenience of excessive manual shifting. However, for an automatic transmission, a transmission control unit automatically executes shifting by controlling the operation of the power train, and therefore, more speeds usually implies more merits.

Accordingly, recently, a power train of an automatic transmission enabling six forward speeds and one reverse speed has been developed.

However, according to the conventional power train, because the clutches and the brakes are disposed to a back of the transmission, an operating hydraulic line is difficult to be formed.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention provides a power train of an automatic transmission having advantages of effectively forming a hydraulic line, minimizing a power loss, and improving drivability.

In addition, the present invention has suppresses tire slip by lowering a first forward speed gear ratio and improves high speed driving performance and reverse running performance.

An exemplary embodiment of the present invention provides a six-speed power train of an automatic transmission for a vehicle including: a first, double pinion planetary gear set including a first operational element always operating as an input element, a second operational element selectively operating as an output element and a fixed element, and a third operational element selectively operating as an input, an output, and a fixed element; a second, Ravingneaux type planetary gear set including a first operational element selectively operating as an input element, a second operational element always operating as an output element, a third operational element selectively operating as an input and a fixed element, and a fourth operational element selectively operating a fixed element; a plurality of clutches disposed between operational elements of the first and second planetary gear sets and variably connecting corresponding operational elements; and a plurality of brakes variably connecting a transmission housing with an operational element operating as the fixed element.

The first operational element of the first planetary gear set is a first sun gear, the second operational element is a first ring gear, and the third operational element is a first planet carrier.

The first operational element of the second planetary gear set may be a second sun gear engaged with a short pinion, the second operational element is a second ring gear, the third operational element is a second planet carrier, and the fourth operational element is a third sun gear engaged with a long pinion.

The first operational element of the first planetary gear set is fixedly connected to the input shaft, the second operational element of the first planetary gear set is variably connected to the second operational element of the second planetary gear set and also variably connected to a transmission housing, the third operational element of the first planetary gear set is variably connected to the input shaft and also variably connected to the transmission housing and fixedly connected to the third operational element of the second planetary gear set.

The first operational element of the second planetary gear set is variably connected to the first operational element of the first planetary gear set, the second operational element of the second planetary gear set is variably connected to the second operational element of the first planetary gear set and also connected to the output gear, the third operational element of the second planetary gear set is fixedly connected to the third operational element of the first planetary gear set, and the fourth operational element of the second planetary gear set is variably connected to the transmission housing.

The plurality of clutches includes a first clutch disposed between the first operational element and the third operational element of the first planetary gear set, a second clutch disposed between the first operational element of the first planetary gear set and the first operational element of the second planetary gear set, and a third clutch disposed between the second operational element of the first planetary gear set and the second operational element of the second planetary gear set.

The plurality of brakes includes a first brake disposed between the third operational element of the first planetary gear set and the transmission housing, a second brake disposed between the second operational element of the first planetary gear set and the transmission housing, and a third brake disposed between the fourth operational element of the second planetary gear set and the transmission housing.

DETAILED DESCRIPTION OF THE PREFERRED EMBODIMENTS

Exemplary embodiments of the present invention will hereinafter be described in detail with reference to the accompanying drawings.

Figure 1:
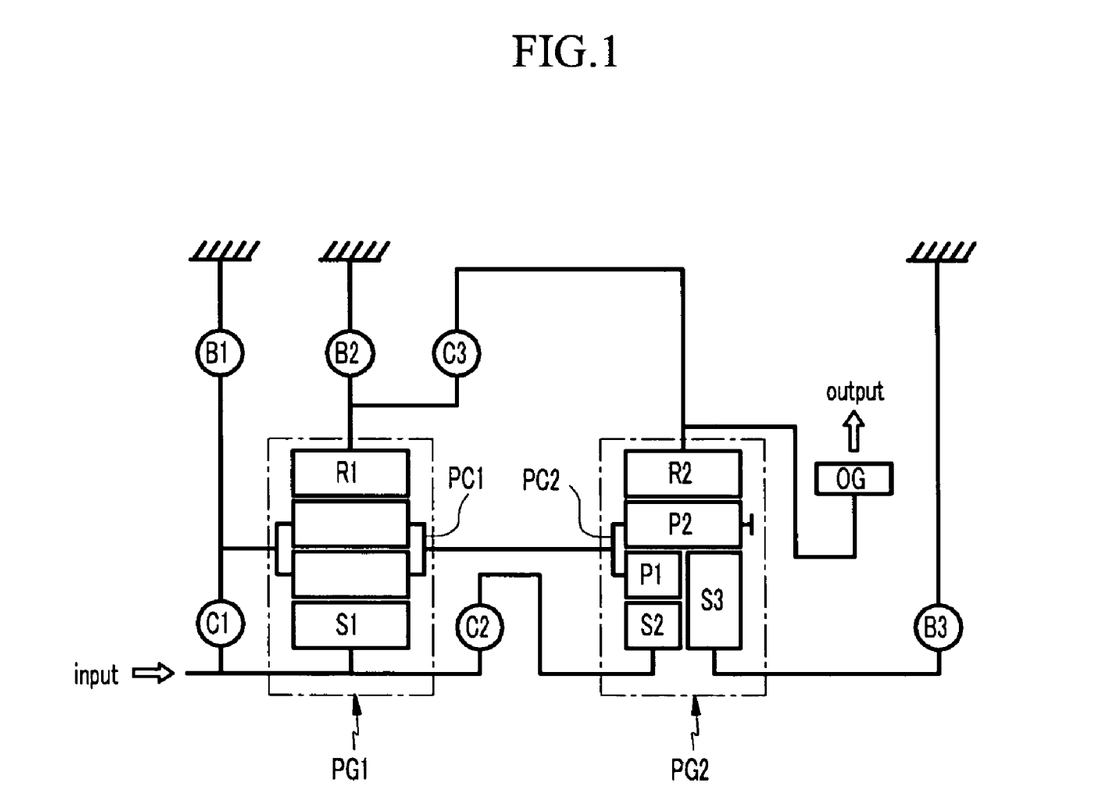
FIG. 1 is a schematic diagram of a power train according to an exemplary embodiment of the present invention.

Referring to FIG. 1, in an exemplary embodiment of the present invention, a power train includes first and second planetary gear sets PG1 and PG2 that are disposed to the same shaft, three clutches C1, C2, and C3, and three brakes B1, B2, and B3.

The first planetary gear set PG1 is a double pinion planetary gear set.

The second planetary gear set PG2 is a Ravingneaux type compound planetary gear set combining a single pinion planetary gear set with a double pinion planetary gear set to join a ring gear and a planet carrier.

The first planetary gear set PG1 includes a first sun gear S1 operated as a first operational element, a first ring gear R1 operated as a second operational element, and a first planet carrier PC1 operated as a third operational element.

The second planetary gear set PG2 includes a second sun gear S2 engaged with a short pinion P1 and operating as a first operational element, a second ring gear R2 operating as a second operational element, a second planet carrier PC2 supporting the short pinion P1 and a long pinion P2 and operating as a third operational element, and a third sun gear S3 engaged with the long pinion P2 and operating as a fourth operational element.

The first sun gear S1 and the input shaft IS are fixedly connected with each other such that the first sun gear S1 always acts as an input element. The first planet carrier PC1 and the second planet carrier PC2 are fixedly connected with each other.

The first clutch C1 is disposed between the first sun gear S1 and the first planet carrier PC1, and the first clutch C1 variably connects the input shaft and the first planet carrier PC1.

The second clutch C2 is disposed between the first sun gear S1 and the second sun gear S2.

The third clutch C3 is disposed between and variably connects the first ring gear R1 and the second ring gear R2.

The first planet carrier PC1 and the first ring gear R1 are variably connected to the transmission housing H via the first and second brakes B1 and B2, respectively.

The third sun gear S3 is variably connected to the transmission housing H via the third brake B3.

An output gear OG is connected to the second ring gear R2 to always operate as an output element.

The output gear OG transmits power to a differential apparatus via a final reducing gear by any known scheme.

Figure 2:
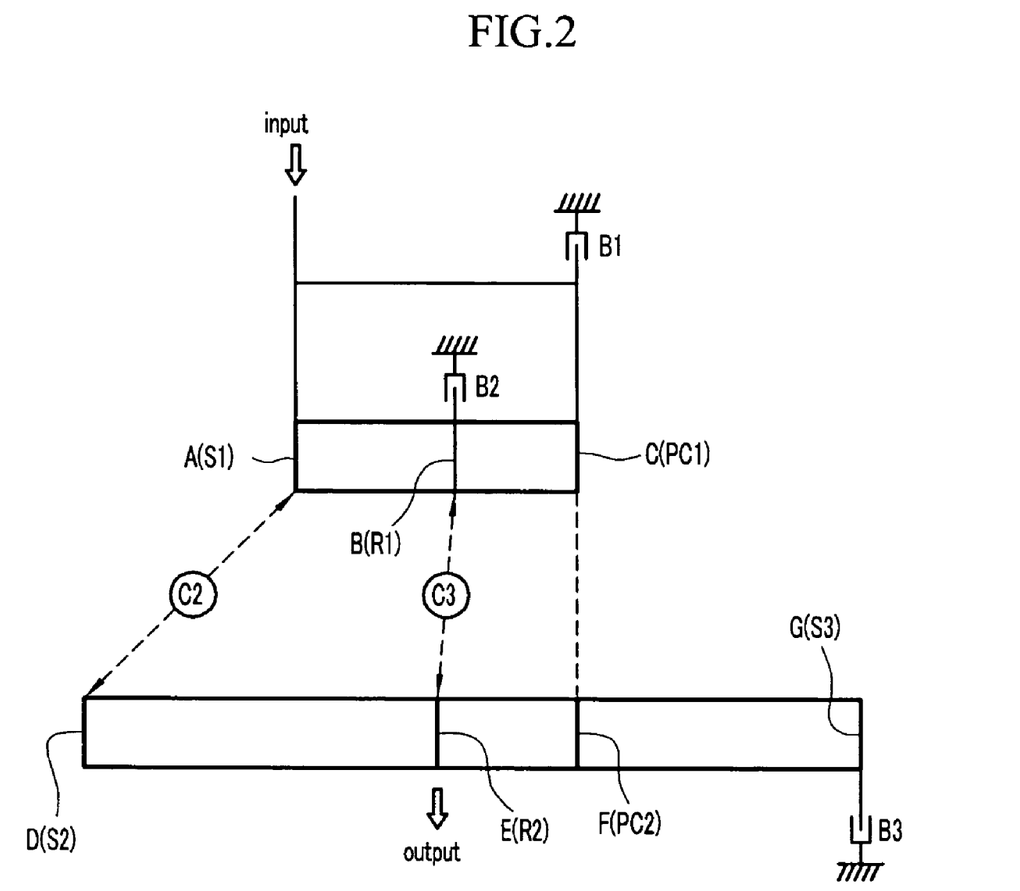
FIG. 2 shows a basic scheme of a power train according to an exemplary embodiment of the present invention.

According to an exemplary embodiment of the present invention, as shown in FIG. 2, the first planetary gear set PG1 is shown on a lever and the first operational element A is the first sun gear S1, the second operational element B is the first ring gear R1, and the third operational element C is the first planet carrier PC1.

The second planetary gear set PG2 is shown on a lever in FIG. 2 where the first operational element D is the second sun gear S2, the second operational element E is the second ring gear R2, the third operational element F is the second planet carrier PC2, and the fourth operational element G is the third sun gear S3.

The third operational element C of the first planetary gear set PG1 and the third operational element F of the second planetary gear set PG2 are fixedly connected.

The first operational element A of the first planetary gear set PG1 is variably connected to the first operational element D of the second planetary gear set PG2 via the second clutch C2.

The second operational element B of the first planetary gear set PG1 is variably connected to the second operational element E of the second planetary gear set PG2 via the third clutch C3.

Figure 3:
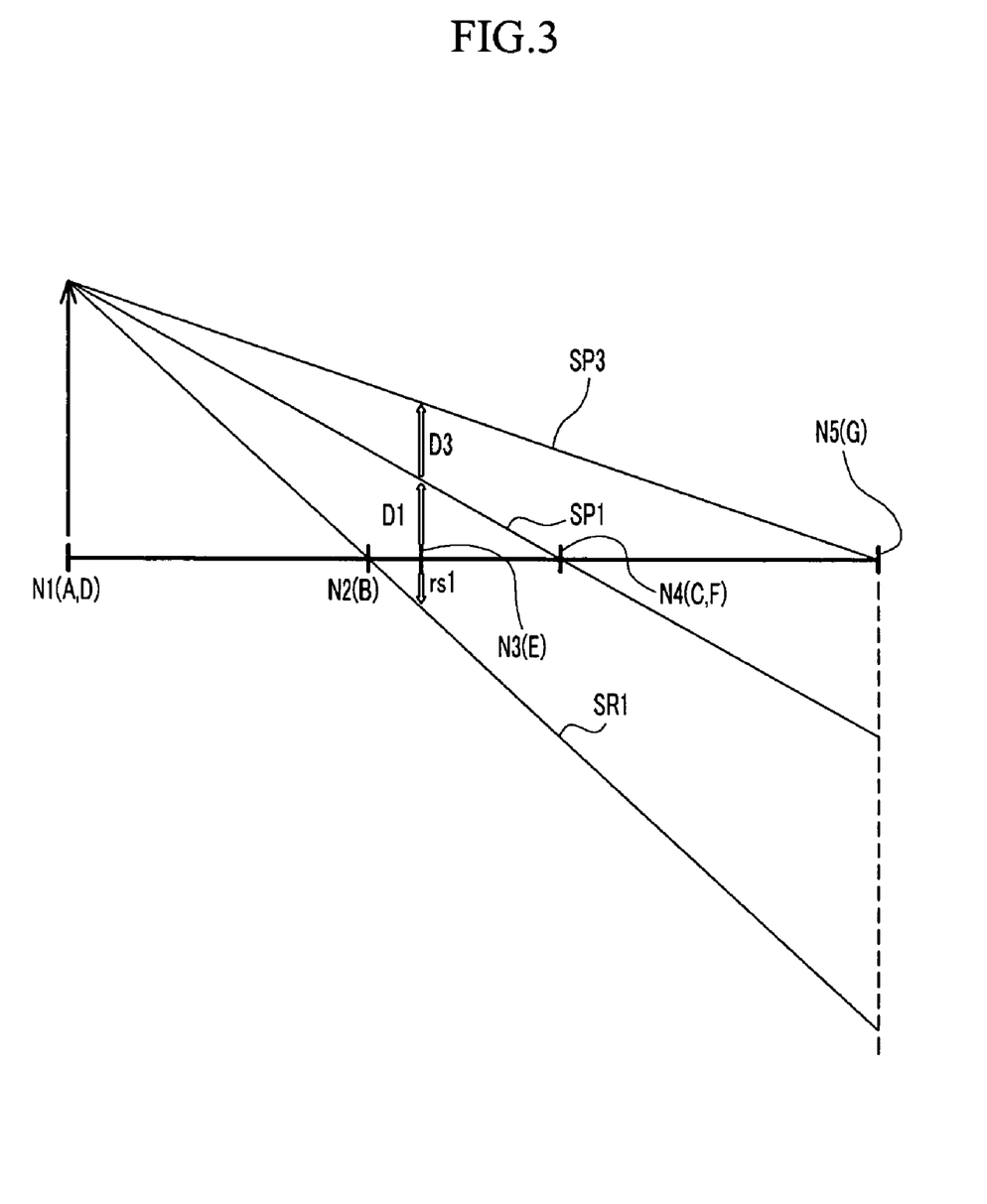
FIG. 3 is a shift diagram of first, third, and fifth forward speeds and a first reverse speed according to an exemplary embodiment of the present invention.

Therefore, if the first operational element A of the first planetary gear set PG1 is connected to the first operational element D of the second planetary gear set PG2 via the second clutch C2, five operational nodes N1, N2, N3, N4, and N5 are determined on the lever, as shown in FIG. 3.

That is, the first operational node N1 is the first operational element A of the first planetary gear set PG1 and the first operational element D of the second planetary gear set PG2, the second operational node N2 is the second operational element B of the first planetary gear set PG1, the third operational node N3 is the second operational element E of the second planetary gear set PG2, the fourth operational node N4 is the third operational element C of the first planetary gear set PG1 and the third operational element F of the second planetary gear set PG2, and the fifth operational node N5 is the fourth operational element G of the second planetary gear set PG2.

Figure 4:
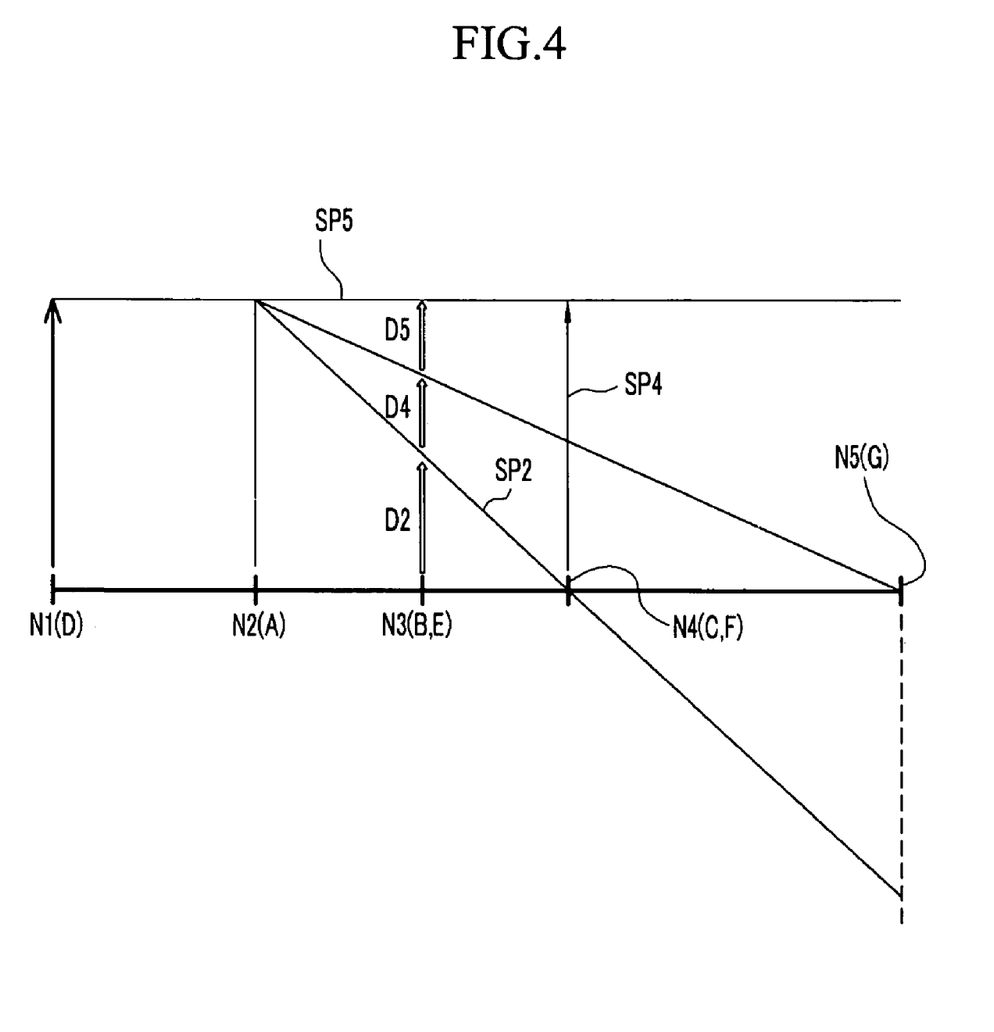
FIG. 4 is a shift diagram of second and fourth forward speeds according to an exemplary embodiment of the present invention.

In addition, if the second operational element B of the first planetary gear set PG1 is connected to the second operational element E of the second planetary gear set PG2 via the third clutch C3, five operational nodes N1, N2, N3, N4, and N5 are determined on the lever, as shown in FIG. 4.

That is, the first operational node N1 is the first operational element D of the second planetary gear set PG2, the second operational node N2 is the first operational element A of the first planetary gear set PG1, the third operational node N3 is the second operational element B of the first planetary gear set PG1 and the second operational element E of the second planetary gear set PG2, the fourth operational node N4 is the third operational element C of the first planetary gear set PG1 and the third operational element F of the second planetary gear set PG2, and the fifth operational node N5 is the fourth operational element G of the second planetary gear set PG2.

Figure 5:
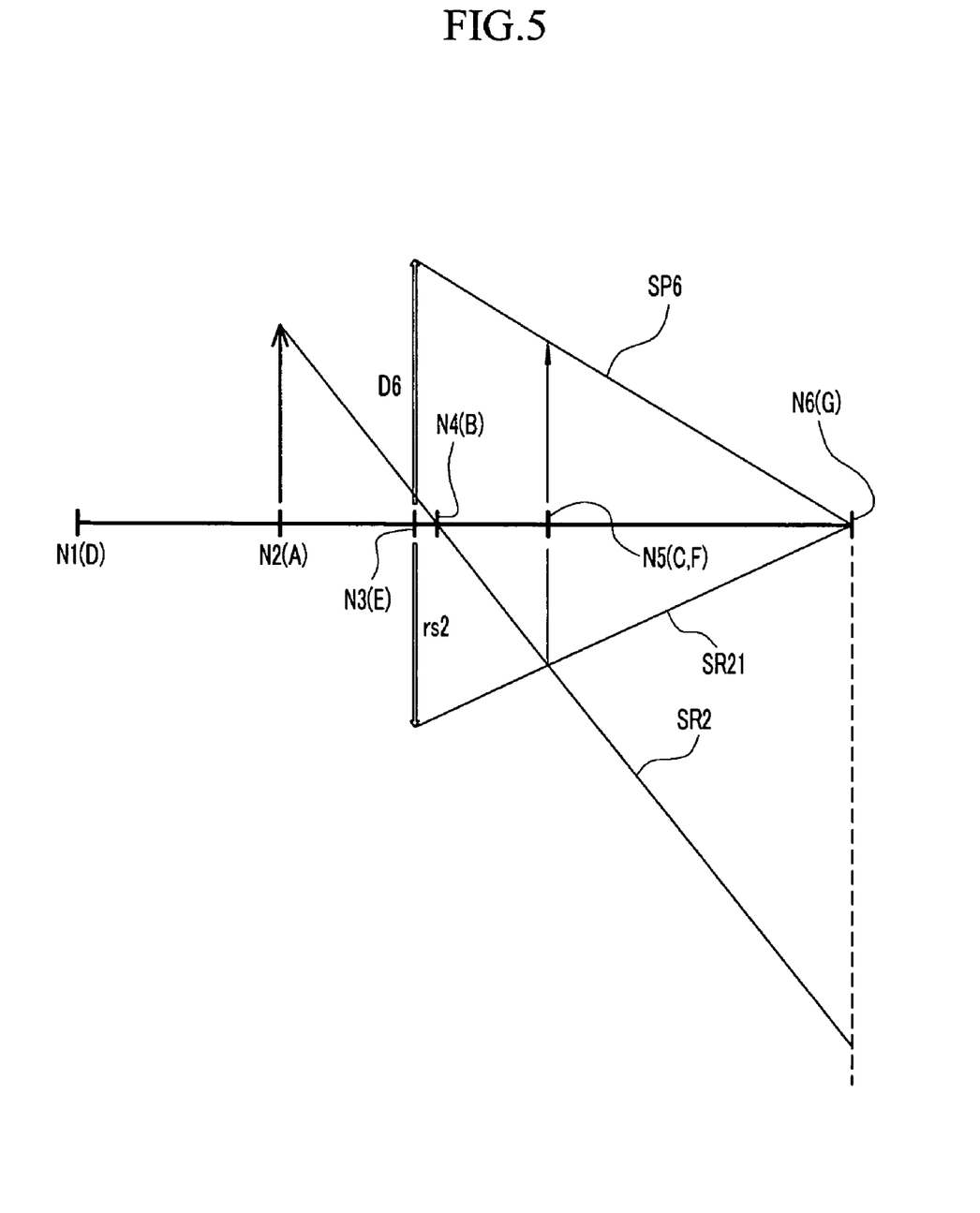
FIG. 5 is a shift diagram of a sixth forward speed and a second reverse speed according to an exemplary embodiment of the present invention.

In addition, if the second and third clutches C2 and C3 do not operate, six operational nodes N1, N2, N3, N4, N5, and N6 are determined on the lever, as shown in FIG. 5.

That is, the first operational node N1 is the first operational element D of the second planetary gear set PG2, the second operational node N2 is the first operational element A of the first planetary gear set PG1, the third operational node N3 is the second operational element E of the second planetary gear set PG2, the fourth operational node N4 is the second operational element B of the first planetary gear set PG1, the fifth operational node N5 is the third operational element C of the first planetary gear set PG1 and the third operational element F of the second planetary gear set PG2, and the sixth operational node N6 is the fourth operational element G of the second planetary gear set PG2.

The method for determining operational nodes will be understood by persons of an ordinary skill in the art based on the teachings herein, and so a detailed description thereof is omitted.

Figure 6:
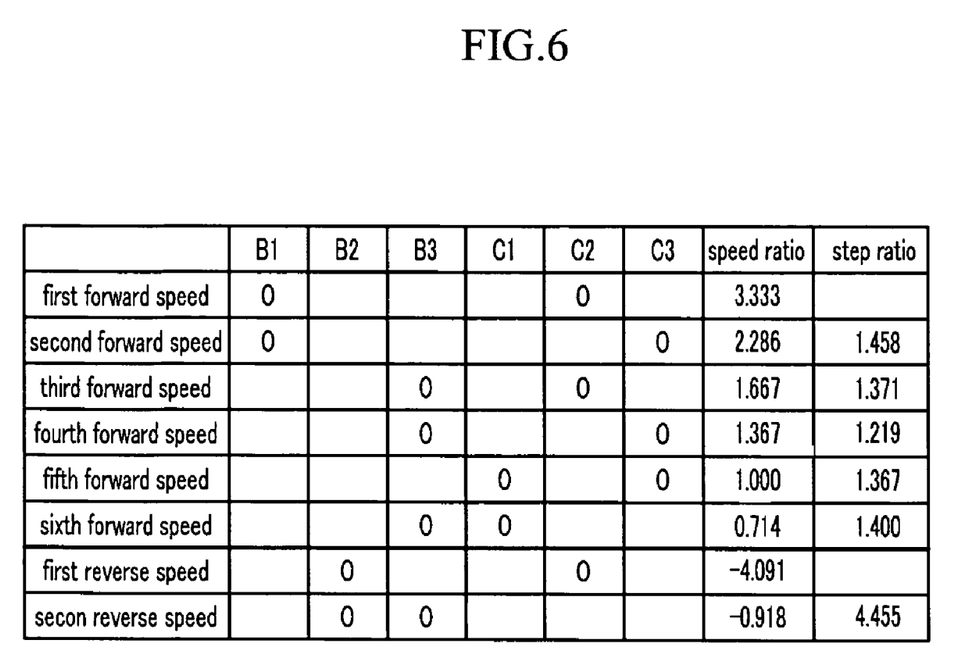
FIG. 6 is an operational chart according to an exemplary embodiment of the present invention.

According to an exemplary embodiment of the present invention, the power train is shifted by controlling frictional elements as shown in FIG. 6, and the shifting process is as follows, referring to FIGS. 3, 4, and 5.

For the first forward speed, the first brake B1 and the second clutch C2 are operated.

Because the second clutch C2 is operated, as shown in FIG. 3, the respective third operational elements C and F of the first and second planetary gear sets PG1 and PG2, which are the fifth operational node N5, are operated as a fixed element by operation of the second brake B2 while the respective first operational elements A and D of the first and second planetary gear sets PG1 and PG2, which are the first operational node N1, remain receiving an input from an engine.

Therefore, the first forward speed line SP1 is attained by operation of the first and second planetary gear sets PG1 and PG2, which are fixedly connected, as shown in FIG. 3.

The output element of the second operational element E of the second planetary gear set PG2, which is the third operational node N3, rotates at a speed D1, and the first forward speed is attained.

To shift from the first to the second forward speed, the second clutch C2 is released and the third clutch C3 is operated.

Because the third clutch C3 is operated, as shown in FIG. 4, the first operational element A of the first planetary gear set PG1, which is the second operational node N2, receives the input of the engine.

In addition, the fourth operational node N4 is operated as the fixed element by the operation of the first brake B1, as in the first forward speed.

Therefore, the second forward speed line SP2 is formed.

The output element of the second operational element B of the first planetary gear set PG1 and the second operational element E of the second planetary gear set PG2, which are the third operational node N3, rotate at a speed D2 and the second forward speed is realized.

To shift from the second to the third forward speed, the first brake B1 and the third clutch C3 are released and the third brake B3 and the second clutch C2 are operated.

Because the second clutch C2 is operated, as shown in FIG. 3, the fifth operational node N5 is operated as the fixed element while the first operational node N1 remains receiving the input of the engine.

Therefore, the third forward speed line SP3 is formed and an output element of the second operational element E of the second planetary gear set PG2, which is the third operational node N3, rotates at a speed D3 and the third forward speed is realized.

To shift from the third to the fourth forward speed, the second clutch C2 is released and the third clutch C3 is operated.

Because the third clutch C3 is operated, as shown in FIG. 4, the first operational element A of the first planetary gear set PG1, which is the second operational node N2, receives the input.

In addition, the fifth operational node N5 is operated as the fixed element by an operation of the third brake B3.

Therefore, the fourth forward speed line SP4 is formed and an output element of the second operational element B of the first planetary gear set PG2 and the second operational element E of the second planetary gear set PG2, which are the third operational node N3, rotate at a speed D4 and the fourth forward speed is realized.

To shift from the fourth to the fifth forward speed, the third brake B3 is released and the first clutch C1 is operated.

The first operational element A and the third operational element C of the second planetary gear set PG2 receive two inputs from the engine by an operation of the third clutch C3, while the first planetary gear set PG1 receives the engine speed at the same time by an operation of the first clutch C1.

Therefore, the second planetary gear set PG2 receives two inputs of the engine speed at the same time as shown in FIG. 4, the fifth forward speed line SP5 is formed, an output element rotates at a speed D5 (i.e., at the same speed as the input engine speed), and the fifth forward speed is realized.

To shift from the fifth to the sixth forward speed, the third clutch C3 is released and the third brake B3 is operated.

The second and third clutches C2 and C3 are not operated, and the shifting is realized as shown in FIG. 5.

Because the first planetary gear set PG2 receives two inputs of the engine speed at the same time by the operation of the first clutch C1, the fourth operational element G of the second planetary gear set PG2, which is the sixth operational node N6, is operated as the fixed element by the operation of the third brake B3, while the fifth operational node N5 remains receiving the input of the engine speed.

Therefore, the sixth forward speed line SP6 is formed and an output element of the third operational node N3 rotates as a speed D6 faster than the input engine speed and the sixth forward speed is realized.

For the first reverse speed, the second clutch C2 and the second brake B2 are operated.

And then, shifting is realized, as shown in FIG. 3, by the operation of the second clutch C2.

At that time, the second operational element B of the first planetary gear set PG1, which is the second operational node N2, is operated as the fixed element by the second brake B2, while the first operational node N1 remains receiving the input of the engine speed.

Therefore, a first reverse speed line SR1 is formed and an output element of the third operational node N3 rotates at a speed rs1 and the first reverse speed is realized.

To shift from the first to the second reverse speed, the second clutch C2 is released and the third brake B3 is operated.

Because the second and third clutches C2 and C3 are not operated, as shown in FIG. 5, the shifting is realized.

The second operational element B of the first planetary gear set PG2, which is the fourth operational node N4, is operated as the fixed element, while the first operational element A of the first planetary gear set PG1, which is the second operational node N2, remains receiving the input of the engine speed by the operation of the second brake B2.

Therefore, a first second reverse speed line SR2 is formed, and the fifth operational node N5 is reversed and the second planetary gear set PG2 receives the input of the engine speed.

In this state, a second reverse speed line SR21 is formed by the operation of the third brake B3, and an output element of the third operational node N3 rotates at a speed rs2 and the second reverse speed is attained.

According to an exemplary embodiment of the present invention, if the number of teeth of the first sun gear S1 and the first ring gear R1 are 35 and 80, and of the second sun gear S2, the third sun gear S3, and the second ring gear R2 are respectively 30, 40, and 100, step ratios of the respective speed ratios can be optimized by which the speed ratios are 3.333 in the first forward speed, 2.286 in the second forward speed, 1.667 in the third forward speed, 1.367 in the fourth forward speed, 1.000 in the fifth forward speed, and 0.714 in the sixth forward speed, as shown in FIG. 6.

As described, according to an exemplary embodiment of the present invention, hydraulic lines can be easily formed by disposing the brakes and the clutches dispersedly, and drivability can be improved by optimizing step ratios.

Also, as shown in the speed diagram, because slip speeds of the revolving frictional elements are small, power loss can be minimized.

In addition, tire slip is minimized when a vehicle starts by lowering the first forward speed ratio, high speed driving performance can be improved by the speed being faster than the input engine speed from the fifth forward speed, and reverse running performance can be improved by forming two reverse speeds.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A six-speed power train of an automatic transmission for a vehicle comprising:
    a first planetary gear set, which is a double pinion planetary gear set comprising a first operational element always operating as an input element, a second operational element selectively operating as an output and a fixed element, and a third operational element selectively operating as an input element, an output element, and a fixed element;
    a second planetary gear set, which is a Ravingneaux type planetary gear set comprising a first operational element selectively operating as an input element, a second operational element always operating as an output element, a third operational element selectively operating as an input element and a fixed element, and a fourth operational element selectively operating as a fixed element;
    a plurality of clutches disposed between and variably connecting operational elements of the first and second planetary gear sets; and
    a plurality of brakes variably connecting a transmission housing with one of the fixed elements of the first and second planetary gear sets.

2. The six-speed power train of claim 1, wherein the first operational element of the first planetary gear set is a first sun gear, the second operational element of the first planetary gear set is a first ring gear, and the third operational element of the first planetary gear set is a first planet carrier.

3. The six-speed power train of claim 2, wherein the first operational element of the second planetary gear set is a second sun gear engaged with a short pinion, the second operational element of the second planetary gear set is a second ring gear, the third operational element of the second planetary gear set is a second planet carrier, and the fourth operational element of the second planetary gear set is a third sun gear engaged with a long pinion.

4. The six-speed power train of claim 1, wherein:
    the first operational element of the first planetary gear set is fixedly connected to an input shaft;
    the second operational element of the first planetary gear set is variably connected to the second operational element of the second planetary gear set and also variably connected to a transmission housing; and
    the third operational element of the first planetary gear set is variably connected to the input shaft and also variably connected to the transmission housing and fixedly connected to the third operational element of the second planetary gear set.

5. The six-speed power train of claim 1, wherein:
    the first operational element of the second planetary gear set is variably connected to the first operational element of the first planetary gear set;
    the second operational element of the second planetary gear set is variably connected to the second operational element of the first planetary gear set and also connected to the output gear;
    the third operational element of the second planetary gear set is fixedly connected to the third operational element of the first planetary gear set; and
    the fourth operational element of the second planetary gear set is variably connected to the transmission housing.

6. The six-speed power train of claim 1, wherein the plurality of clutches comprises:
    a first clutch disposed between the first operational element and the third operational element of the first planetary gear set;
    a second clutch disposed between the first operational element of the first planetary gear set and the first operational element of the second planetary gear set; and
    a third clutch disposed between the second operational element of the first planetary gear set and the second operational element of the second planetary gear set.

7. The six-speed power train of claim 1, wherein the plurality of brakes comprises:
    a first brake disposed between the third operational element of the first planetary gear set and the transmission housing;
    a second brake disposed between the second operational element of the first planetary gear set and the transmission housing; and
    a third brake disposed between the fourth operational element of the second planetary gear set and the transmission housing.

8. A six-speed power train of an automatic transmission for a vehicle comprising:
    a first planetary gear set, which is a double pinion planetary gear set comprising a first sun gear, a first ring gear, and a first planet carrier;
    a second planetary gear set, which is a Ravingneaux type planetary gear set comprising a second sun gear engaged with a short pinion, a second ring gear, a second planet carrier, and a third sun gear engaged with a long pinion, wherein:
    the first sun gear always acts as an input element, and a first clutch is disposed between the first sun gear and the first planet carrier;
    a second clutch is disposed between the first sun gear and the second sun gear;
    the third clutch is disposed between the first ring gear and the second ring gear; and
    first, second, and third brakes are independently disposed between the first sun gear and the first ring gear, and between the second planet carrier and a transmission housing.

* * * * *